INVENTOR.
CLIFFORD DITCHFIELD

BY Maybee & Legris

ATTORNEYS

United States Patent Office 3,377,086
Patented Apr. 9, 1968

3,377,086
TRAILER TOW-BAR DAMPER MECHANISM
Clifford Ditchfield, Brampton, Ontario, Canada, assignor, by mesne assignments, to Orenda Limited, Malton, Toronto, Ontario, Canada
Filed June 9, 1966, Ser. No. 556,381
7 Claims. (Cl. 280—489)

This invention relates to tow devices for trailers. More particularly, the invention is concerned with a tow device which will allow relative pivotal movement between the trailer and a towing vehicle about an axis parallel to the support wheels for the trailer.

The invention is particularly applicable to two wheel, or short wheelbase, multi-wheel trailers such as are used for carrying boats or military equipment and such as are also in use for house trailers. With trailers of this type, as opposed to trailers having a long wheelbase, the tow bar determines the attitude of the trailer and it bears a great deal of the direct downward load since the centre of gravity of the loaded trailer must be kept forward of the support wheels for the trailer to maintain a positive load on the towing vehicle.

Bouncing of the trailer over rough ground causes the trailer load to oscillate about the rotational axis of the support wheels thus applying bending loads to the tow bar. In some circumstances, resonant conditions may prevail so that the load will be amplified. Long tow bars are often required for short wheelbase trailers and this tends to aggravate the undesirable conditions which occur over rough ground resulting in a high failure rate due to fatigue.

It is an object of the present invention to provide a tow device for a trailer in which oscillations which occur in service due to travel, for example, over rough ground, are damped.

We achieve this object by providing a tow device for a trailer having support wheels mounted for rotation about an axis, the tow device comprising a first member to be secured to the trailer, a second member to be connected to a towing vehicle, pivot means interposed between the members connecting them for relative movement about a pivot axis parallel to the axis of rotation of said wheels, resilient means interposed between the members to urge the members towards an initial relative position about the pivot axis and damping means connected between the members to damp said relative movement.

An embodiment of the invention will now be described by way of example with reference to the accompanying drawings in which.

Figure 1:
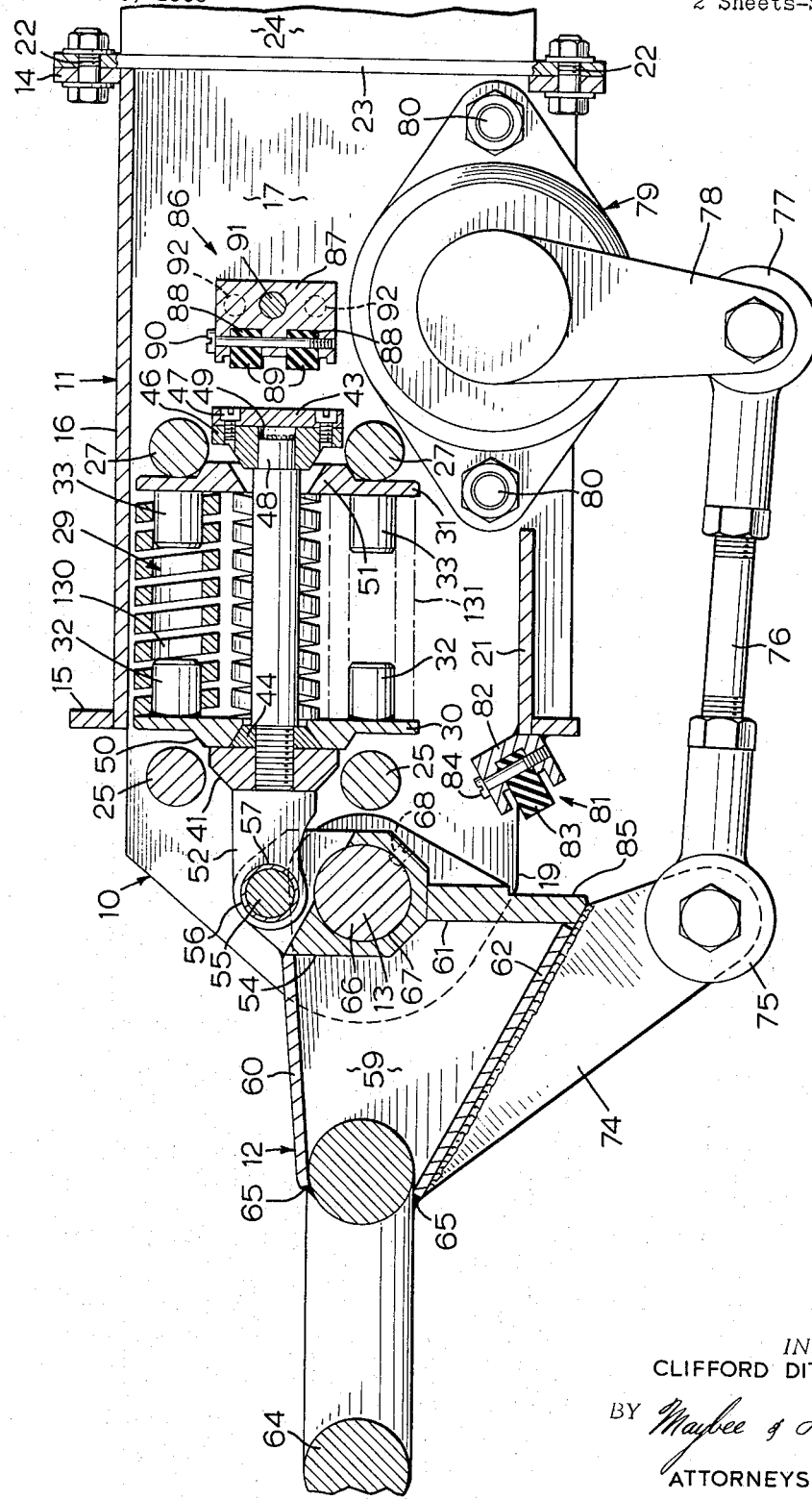
FIG. 1 is a side sectional elevation of a device on the line 1—1 of FIG. 2.

Referring now to the drawings, the tow device is indicated generally at 10 and comprises a first member 11 to be secured to the trailer and a second member 12 to be secured to a towing vehicle. The members are pivoted together for relative movement about a pivot axis 13 as will hereinafter be described, the pivot axis being parallel to the axis of rotation of the supporting wheels (not shown) of the trailer.

Turning now to the first member, this has a rear end flange 14 and a forward end flange 15. Each flange has a rectangular hole therein. Secured to the upper edges of the holes in the flanges 14 and 15 is a top plate 16 and secured to the side or vertical edges of the holes are two side plates 17 and 18. The side plates extend forwardly of the front end flange 15 to provide a pair of apertured lugs 19 and 20. Secured to the bottom edge of the aperture in the front end flange 15 is a bottom plate 21 which extends only part way towards the rear end flange 14 as is clearly shown in FIG. 1, The rear end flange 14 is bolted by means of a plurality of bolts 22 to a flange 23 at the forward end of the tow bar 24.

Extending betweeen the side plates 17 and 18 are two pairs of rod-like abutments. Thus there is a forward or first pair of abutments indicated at 25. The ends of the abutments 25 pass through apertures in the side plates 17 and 18 and are retained in position by circlips 26 received in peripheral grooves in the abutments.

Similarly there is a rear pair of abutments 27 also of rod-like form and extending between the side plates 17 and 18, the abutments 27 being retained in position by means of circlips 28 received in peripheral grooves in the ends thereof. It will be seen from FIG. 2 that the abutments of each pair are arranged with their centre lines on a vertical plane.

Interposed between the abutments 25 and 27 is spring means indicated generally at 29. The spring means comprises a first plate 30 and a second plate 31. Interposed between the plates are nine helical compression springs, there being an upper row of three springs one of which is indicated in FIG. 1 at 130 and a lower row of three springs one of which is indicated in FIG. 1 in chain lines at 131. Each of the springs 130 and 131 is located by means of short spigots 32 and 33 fixed to the plates 30 and 31 respectively and engaged in the bore of the spring.

Figure 2:
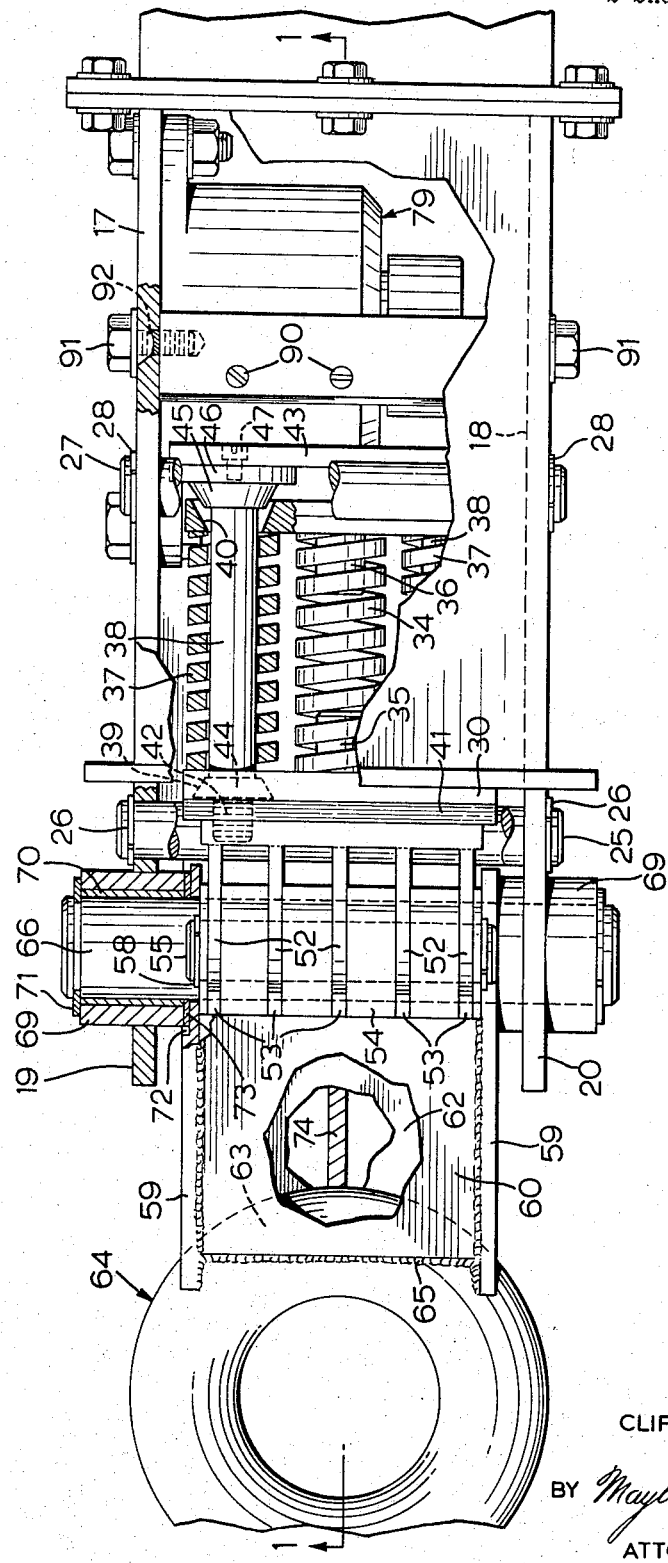
FIG. 2 is a plan view of the device, part thereof being broken away.

The middle row of springs comprises a centre spring 34 indicated in FIG. 2 which is located by spigots 35 and 36 on the plates 30 and 31 respectively, the spigots 35 and 36 being similar to the spigots 32 and 33 respectively.

Each outer spring 37 of the centre row is located by means of a rod 38 which passes through the bore thereof. Each rod also passes through a frusto-conical aperture 39 in the plate 30 and a frusto-conical aperture 40 in the plate 31; there are thus two apertures 39 and 40 in each of the plates 30 and 31, each pair of apertures receiving a rod 38.

The forward end of each of the rods 38 is connected to a transverse bar 41 by being threadably engaged in a bore therein as indicated in FIG. 2 at 42. The rear end of each rod 38 is also connected to a transverse bar 43. The forward end of each rod carries a frusto-conical collar 44 which is a good fit in its associated aperture 39 in the plate 30. Similarly, the rear end of each rod 38 carries a frusto-conical collar 45 having a rear cylindrical flange 46. The transverse bar 43 is fixed to the cylindrical flanges 46 by means of screws 47. The collars 45 are welded on reduced section end parts 48 of the rods 38, the welds being indicated at 49 in FIG. 1. When the springs between the plates 30 and 31 are not compressed, the springs force the plates into engagement with the abutments 25 and 27, thus the first plate 30 is forced into engagement with the first abutments 25 and the second plate 31 is forced into engagement with the second abutments 27. The plates have raised central portions 50 and 51 respectively which centre them between the abutments of each pair.

Returning now to the bar 41 this is provided with five forwardly projecting tongues 52 which are received in slots 53 in a bearing block 54. A pivot pin 55 passes through a bearing in the block and engages bearings 56 held in circular apertures 57 in the tongues 52 so that a bar 41 and the block 54 are pivoted together by means of the pin 55. The pin is held in position in the block 54 by means of circlips 58 received in grooves in the end of the pin.

Referring now to the second member 12, this comprises a block 54 to which are attached side plates 59, and a top plate 60, the plates extending forwardly from the block 54. Depending from the block 54 is a back plate 61 which is connected between the side plates 59 and a bottom plate 62 is inclined to the horizontal and is connected at its rear end to the back plate 61.

At the front of the second member there is provided an opening between the side plates 59 and the top and bottom plates 60 and 62 and into this opening is received a portion 63 of a lunette ring 64. The portion 63 is welded in position as indicated at 65.

The parts 11 and 12 are pivoted together by means of a pivot pin 66 which is received in a bore 67 in the block 54 and is locked against rotation therein by means of a set screw 68. The outer ends of the pin 66 are received in bearing housings 69 which are welded in apertures in the lugs 19 and 20. Each bearing housing 69 carries a bearing 70 in which is received an end portion of the pivot pin 66. The pivot pin is located axially by means of circlips 71 which are received in peripheral grooves in the ends of the pin and abut the ends of the bearing housings 69. The side plates 59 are counterbored as indicated at 72 and an end thrust washer 73 is inserted between the base of the counterbore and each bearing housing 69. The members 11 and 12 can thus pivot relative to one another about the pivot pin 66, i.e., about the axis 13.

Depending from the bottom plate 62 of the second member 12 is a lug 74 which at its lower end is connected by a ball and socket fitting 75 with a forward end of an adjustable link 76. The other end of the link 76 is connected by a ball and socket fitting 77 to the depending arm 78 of a conventional damping device indicated generally at 79. The device 79 is bolted at 80 to the side plate 17.

Mounted on the lower portion of the forward end flange 15 is a stop indicated generally at 81. The stop comprises a U-shaped housing 82 which carries a projecting rubber block 83 held in position by screws 84. In one limiting position of the device the surface 85 on the back plate 61 of the second member will contact the rubber block 83.

A second stop is indicated generally at 86 and comprises a block 87 having in its forward face two U-shaped slots 88 in which are received rubber blocks 89, the blocks being held in position by screws 90. The block 87 extends between the side plates 17 and 18 and is held in position by bolts 91 which pass through the side plates and are engaged in the ends of block 87. The block 87 is also retained in position by two plug welds 92 above and below the bolts 91. In a limiting position of the device the transverse bar 43 will engage the rubber blocks 89.

The operation of the device is as follows: The springs between the plates 30 and 31 will, when the device is not in operation, force the plates into engagement with the abutments 25 and 27 thus engaging the frusto-conical collars 44 and 45 in the apertures 39 and 40 and causing the first and second members to take up an initial position relative to one another about the pivot axis 13, the spring force being transmitted to a second member 12 through the rods 38, the transverse bar 41, the tongues 52 and the pivot pin 55.

If the lunette ring 64 is now placed on the hitch of a towing vehicle, the force on the first member 11 will be downward since the centre of gravity of the trailer will be forward of the supporting wheels as described above. As a result, the first member 11 will tend to rotate in an anti-clockwise direction about the axis 13 relative to the second member 12. This will result in the members taking up the positions shown in the drawings in that the front or first plate 30 has been moved rearwardly through the transverse bar 41 and the springs between the plates have been compressed retaining the second plate 31 against the second abutments 27. It will be noted that the force applied to the plate 30 is through the frusto-conical collars 44 while the collars 45 have moved out of their corresponding apertures 40. At the limit of the anti-clockwise movement of the first member 11 relative to the second member 12 the transverse bar 43 will engage the rubber blocks 89 just before full rearward compression of the springs between the plates takes place.

If, during travel over rough ground, the direction of the force between the towing vehicle and the trailer reverses, the first member 11 will move in a clockwise direction relative to the second member 12 about the pivot axis 13 and as a result the first plate 30 will be forced against the first abutments 25, the frusto-conical collars 45 will engage in their apertures 40 in the second plate 31 and the frusto-conical collars 44 will move out of their apertures 39 in the first plate 30. At the limit of movement in this direction, the surface 85 on the back plate 61 of the second member 12 would engage the rubber block 82 on the stop 81.

It will be seen that as a result of travel over rough ground the members 11 and 12 will pivot relative to one another about the pivot axis 13. This pivotal movement will be damped by means of the damping device 79 which is mounted on the first member 11 as described and which is connected through the link 76 to the lug 74 on the second member. Thus relative pivotal movement of the members about the axis 13 will be damped in whichever direction it occurs. The damping device 79 is of any suitable conventional kind and may be of the kind used as shock absorbers in automobiles. As is well known in such devices the resistance to movement can, if desired, be made to be different in the two different directions so that it is possible to damp the oscillations more heavily for relative rotation in one direction as compared with the damping in respect of relative rotation in the other direction.

It is essential that the hitch on the towing vehicle be such as to allow the lunette ring freedom to pivot in both vertical and horizontal planes.

It will be seen that the invention provides a tow device which allows relative pivotal movement between the parts and damps this movement thus preventing any amplification of the bending forces on the tow bar of the trailer and thus helping to prevent failure of such tow bar by metal fatigue.

What I claim as my invention is:

1. A tow device for a trailer having support wheels mounted for rotation about an axis, said tow device comprising a first member to be secured to the trailer, a second member to be connected to a towing vehicle, pivot means interposed between the members connecting them for relative movement about a pivot axis parallel to the axis of rotation of said wheels, resilient means interposed between the member to urge the members towards an initial relative position about the pivot axis, a damping means connected between the members to damp said relative movement, said resilient means including spring means carried on the first member and a first link engaging the spring means and pivotally connected to the second member, said damping means including a rotary damping device carried on the first member and a second link connected to the damping device and pivotally connected to the second member, said pivot axis lying between the pivotal connections of the links to the second member, said second member having a bore extending parallel to said pivot axis and a plurality of spaced parallel slots intersecting the bore normal to the longitudinal axis thereof, a plurality of parallel spaced tongues on the first link, the tongues being received in the slots in the block and each having a circular aperture in alignment with said bore, and a pivot pin received in the bore and the apertures to provide the pivotal connection between the first link and the second member.

2. A tow device as claimed in claim 1 in which the resilient means comprises first and second plates urged apart by said spring means and wherein first and second spaced abutments on the first member are engaged by the plates in said initial position of the members, the first abutment serving to limit displacement of the first plate in one direction and the second abutment serving to limit displacement of the second plate in the opposite direction.

3. A tow device as claimed in claim 2 including at least one rod on the first link, the or each rod passing through apertures in the plates, first and second spaced collar means carried on the or each rod and being engageable with the first and second plates respectively whereby when first link is displaced by relative pivotal movement of the first and second members in one sense about said pivot axis the first collar means engages the first plate, the spring is compressed between the plates and the second plate is forced against the second abutment, whereas when said first link is displaced by relative pivotal movement of the first and second members in the other sense about said pivot axis the second collar means engages the second plate, the spring is compressed between the plates and the first plate is forced against the first abutment.

4. A tow device as claimed in claim 3 wherein the collar means comprises frusto-conical collars and the apertures in the plates are also frusto-conical.

5. A tow device as claimed in claim 4 in which said spring means comprises a plurality of helical compression springs each held between the first and second plate elements and having its longitudinal axis parallel to the direction of displacement of the link, and wherein the or each rod passes through the bore of one of said springs.

6. A tow device according to claim 5 including two rods of the first link, each of said rods passing through the bore of a different one of said springs and bars connecting the ends of the rods.

7. A tow device as claimed in claim 6 including a stop on the first member which abuts one of said bars to limit relative angular movement of the first and second members.

References Cited

UNITED STATES PATENTS

| 1,860,122 | 5/1932 | Wikander | 267—1 |
| 2,402,400 | 6/1946 | Hewitt et al. | 267—1 |

FOREIGN PATENTS

| 226,129 | 6/1959 | Australia. |
| 236,358 | 8/1960 | Australia. |
| 1,193,492 | 4/1959 | France. |
| 1,285,095 | 1/1962 | France. |
| 1,357,102 | 2/1964 | France. |
| 835,262 | 3/1952 | Germany. |

LEO FRIAGLIA, *Primary Examiner.*